Oct. 27, 1964  A. G. V. GUSTAFSSON  3,154,317
SUSPENSION DEVICE FOR VEHICLES
Filed Nov. 22, 1961  2 Sheets-Sheet 1

INVENTOR.
AXEL GERHARD VÄRNE GUSTAFSSON
BY Hane and Nydick
ATTORNEYS

United States Patent Office 3,154,317
Patented Oct. 27, 1964

3,154,317
SUSPENSION DEVICE FOR VEHICLES
Axel Gerhard Värne Gustafsson, Bofors, Sweden, assignor to Aktiebolaget Bofors, Bofors, Sweden, a Swedish company
Filed Nov. 22, 1961, Ser. No. 154,213
Claims priority, application Sweden Nov. 26, 1960
2 Claims. (Cl. 280—104)

The present invention relates to a car chassis comprising two front wheels and two rear wheels, which are supported so that they can be turned in the vertical plane in the longitudinal direction of the car, the suspension members then being connected together in such a way that the turning of one wheel entailed by the ground surface will involve the same turning in the same direction of the diagonally opposite wheel, while the other two wheels are turned to the same extent in the opposite direction.

Such a car chassis has good mobility in rough terrain, and is used in tractors.

In known designs of such car chassis, the wheels have been suspended on each side in a common beam which has been supported so that they can be turned on the car chassis half way between the wheels. As a consequence of this, it has hitherto not been possible to use such car chassis for track-laying vehicles if it is desired that these are to have more than two supporting wheels on each side or if it is desired to be able to control the mean height of the car above the ground.

The purpose of the present invention is to eliminate these disadvantages, and this is achieved according to the invention in that the wheels have been supported on suspension members in the form of pendulum arms or eccentrics, so that the wheel axles can be turned round fixed, transversal axles arranged at a distance from each other in the longitudinal direction of the car.

Further purposes of the invention, and the means by which they are achieved will be noted from the following description of some examples of car chassis according to the invention.

Figure 1:
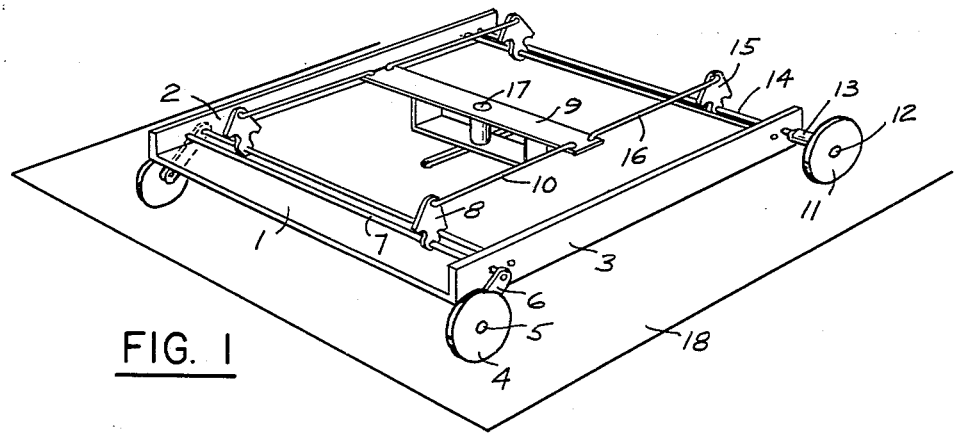
Figure 2:
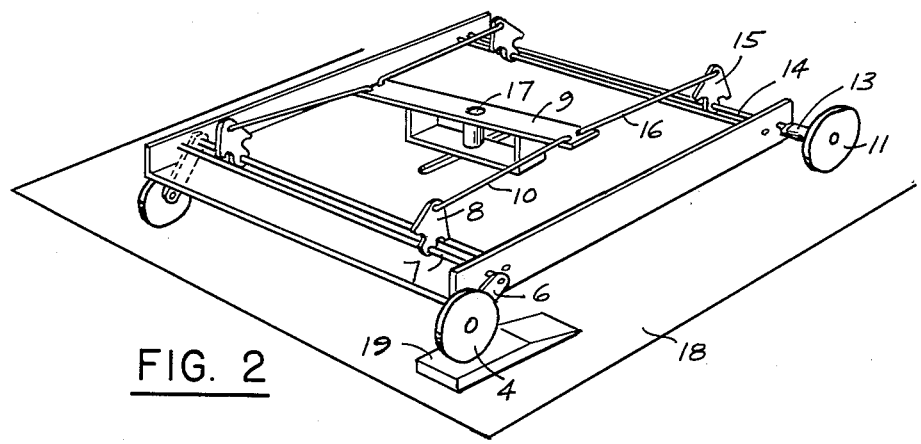
Figure 3:
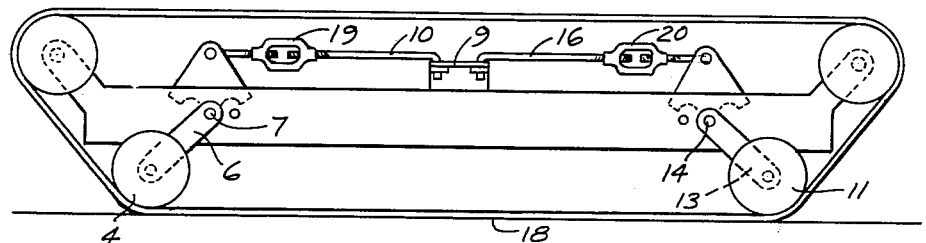
Figure 4:
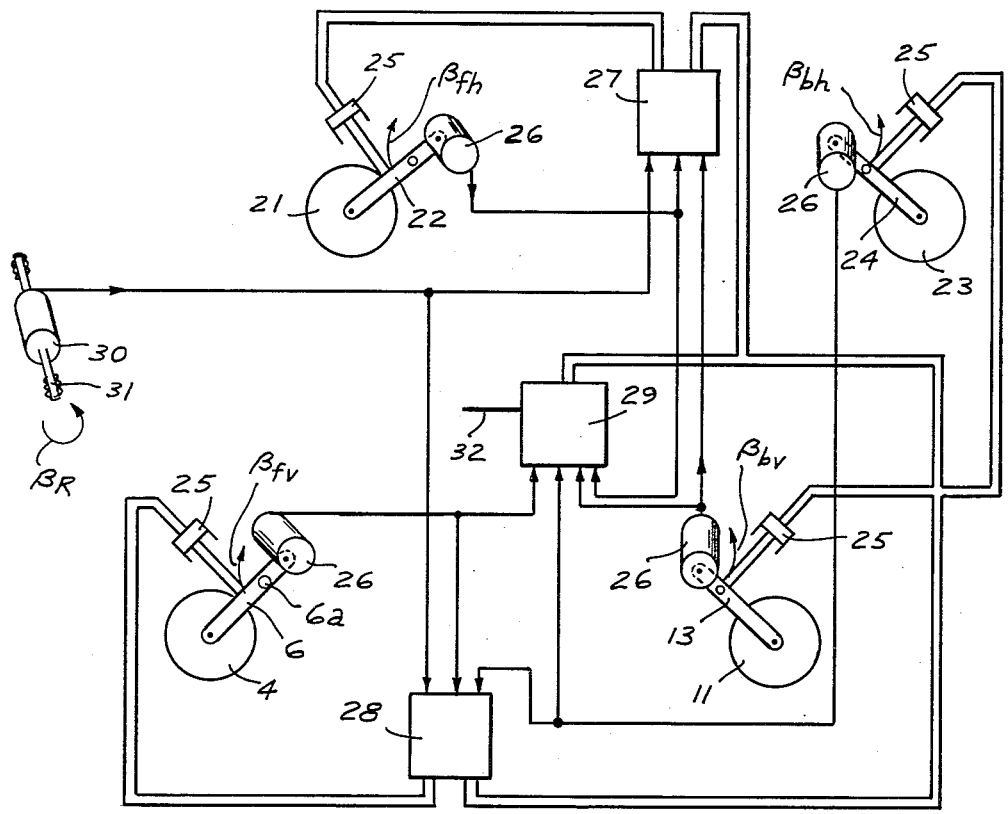

In the drawing, FIGURE 1 shows in perspective a car chassis designed according to the invention, FIGURE 2 shows the same chassis in another position, FIGURE 3 shows a side view of a somewhat modified design of a chassis according to the invention, and FIGURE 4 shows a connection diagram for hydraulic control of the wheel positions in a chassis according to the invention.

In the schematic design according to FIGURES 1 and 2, the chassis consists of a plate 1 with parallel opposite sides 2 and 3 bent at an angle. The left front wheel has been designated 4, and has been supported on a journal 5 on a pendulum arm 6, which is fastened to an axle 7 which can turn in the chassis. On the said axle 7 a vertical lever 8 has been fastened, and the outer end of the lever 8 is connected with a traverse 9 with the aid of a bar 10. The left rear wheel has been designated 11. It has been supported on a journal 12 on a pendulum arm 13, which has been fastened to an axle 14, which is provided with a lever 15. This is also connected with the traverse 9 by means of a bar 16. The right front wheel and the right rear wheel have been suspended in the same way.

The traverse 9 can turn round a vertical journal 17, which can be held stationary in the car but which, if it is desired, can be displaced in the longitudinal direction of the car under the influence of an inner force in the car.

In FIGURE 1, all four wheels of the car—of which, however, only three have been shown—rest on a plane surface 18. If the left front wheel of the car, as shown in FIGURE 2, passes over a protuberance 19 on the surface, the pendulum arm 6 will swing upwards, with the result that the lever 8 will swing towards the right and the bar 10 will be displaced towards the right in the figure. The traverse 9 will be turned counter-clockwise, and the bar 16 will also be displaced to the right to the same extent as the bar 10. The result of this is that the pendulum arm 13 will be turned downwards to the same angle as the pendulum arm 6 is turned upwards. On the right side of the car, the pendulum arms on which the wheels have been supported will be turned to the same angles. However, the front wheel will then be lowered and the rear wheel will be raised.

The car chassis shown has the property that the mean value of the pendulum arm angles of the wheels for each side of the car are constant.

The car chassis also has the property that its angle of inclination is equal to the mean value of the ground inclination transversally at the front wheels and the ground inclination transversally at the rear wheels.

If the vertical journal 17 is displaced in the longitudinal direction of the car and is fastened in a position other than the one shown in FIGURES 1 and 2, the pendulum arms for the two front wheels will be turned in the same direction at approximately the same angle, while the pendulum arms for the two rear wheels will be turned to approximately the same angle but in a direction opposite the angle to which the front wheels are turned. The angle of inclination of the car in the longitudinal direction can thereby be controlled, and this makes it possible to use the car as a lower carriage for a firearm which cannot be elevated in relation to the lower carriage.

As shown in FIGURE 3, a driving track 18 can be placed over the wheels on each side of the car which can be turned and over two wheels supported in the chassis which cannot be turned. From the same figure it will also be noted that if the pendulum arms 6 and 13 are turned out of the symmetrical position shown, the stress on the track 18 will increase. This can be counteracted in that each of the bars 10 and 16 are made in two sections, which are joined by means of nuts 19 and 20, which are provided with threads according to the turnbuckle principle. By turning the nuts 19 and 20, the mean height of the car over the ground surface can be controlled. It is shown by FIGURE 3 that if the pendulum arms 6 and 13 are turned against each other, the height of the car above the ground will increase, and also the track stress will increase. If the pendulum arms are moved away from each other, the height of the car above the ground will decrease, and the track stress will decrease. The nuts 19 and 20—and the corresponding nuts on the opposite side of the car—can consequently be controlled to reduce the track stress.

In practice, it can often be impossible to use the mechanical power transmission system shown in FIGURES 1, 2 and 3. The different bar systems can take up too much of the space in the car.

However, it is possible to use a hydraulic or electro-hydraulic power transmission system with statically the same properties as a mechanical system. In FIGURE 4 the principle for an electro-hydraulic power transmission system has been shown.

In FIGURE 4 the left front wheel 4 will be found with the appurtenant pendulum arm 6 and the left rear wheel 11 with the appurtenant pendulum arm 13. Furthermore, the right front wheel and pendulum arm have been designated 21 and 22, respectively, while the right rear wheel and pendulum arm have been designated 23 and 24, respectively. Each pendulum arm can be turned round a fixed axle in the chassis of the car, as is diagrammatically indicated at 6a for pendulum arm 6.

The angular position of each pendulum arm is determined by a hydraulic motor, which has been shown as a cylinder piston system 25. The angular position of each pendulum arm is registered with the aid of a synchro 26. In FIGURE 4, hydraulic connections have been shown with double lines and electrical circuits with single lines. The electro-hydraulic servo systems 27, 28 and 29 are comprised in the electrical and hydraulic circuits. There is also an aiming gear synchro 30, which follows a control member 31 for setting the inclination of the car in the longitudinal direction, and a setting member 32 for setting the height of the car above the mean ground level.

In the following, the system will be described mathematically, and all angular changes are then calculated positive in the direction indicated with an arrow in the different positions in the figure. The angle of the left front wheel is designated $\beta fv$, the angle of the left rear wheel is designated $\beta bv$, the angle of the right front wheel is designated $\beta fh$ and the angle of the right rear wheel is designated $\beta bh$. The angle of the aiming gear synchro is designated $\beta R$.

The electro-hydraulic servo system 27 controls the right front wheel and the left rear wheel according to the following equation, in which $G_1$ is the transmission function of the servo system.

$$\beta R = G_1(\beta fh - \beta bv) \quad (1)$$

The electro-hydraulic servo system 28 controls the left front wheel and the right rear wheel according to the equation $$\beta R = G_1(\beta fv - \beta bh) \quad (2)$$

These two equations give $$\beta R = G_1\left(\frac{\beta fh + \beta fv}{2} - \frac{\beta bh + \beta bv}{2}\right)$$

$$F_1 = G_1 \cdot \alpha \quad (3)$$

in which $F_1$ is a function of $\beta R$ and depends upon the dimensions of the car and in which $\alpha$ is the angle of elevation of the car—its angle in the longitudinal direction in relation to the ground surface.

The Equation 3 thus says that the angle of elevation of the car is controlled by the angle $\beta R$ of the aiming gear synchro 30.

The electro-hydraulic servo system 29 sets the car at a certain height above the mean ground level according to the following equation $$F_2 = G_2 \frac{\beta fh + \beta fv + \beta bh + \beta bv}{4} = F_3 \quad (4)$$

the height of the car.

$F_2$ can be made dependent on $\beta R$ so that e.g. the height of the car will be constant.

$G_2$ is the transmission function of the system.

The Equations 1 and 2 give $$\beta fh - \beta fv = \beta bv - \beta bh \quad (5)$$

Equation 5 shows that the car is inclined transversally at an angle approximately equal to the mean value of the ground inclination angles at the front and rear.

Equations 4 and 5 give $$F_2 = G_2 \frac{\beta bv + \beta fv}{2} \quad (6)$$

and $$F_2 = G_2 \frac{\beta bh + \beta fh}{2} \quad (7)$$

From Equations 4, 6 and 7 it can be seen that the functions $F_2$ also can be chosen so that the track stress will be constant.

The design shown in FIGURE 4 has the advantage that the hydraulic pumps in the servo system 27 and 28 only need to be dimensioned for the difference in pressure between the suction and pressure sides of the corresponding pumps. Moreover, the pump in the servo system 29 only needs to be dimensioned for a comparatively small indicated quantity of fluid per time unit.

I claim:

1. A suspension device for vehicles comprising, in combination, a generally plane chassis, four wheel supporting levers pivotally mounted on said chassis, a wheel rotatably supported on each of said levers, movable means connected to each of said levers and movable relative to the chassis to pivot said levers so as to vary the distances between the general plane of the chassis and the axes of rotation of said wheels, control means operably connected to said movable means such that pivotal movement of any one of said wheel supporting levers caused by an encounter of the respective wheel with a protuberance on a surface along which the vehicle rides will cause operation of the control means to pivot the other three wheel supporting levers, pairs of diagonally opposed wheel supporting levers being pivoted in opposite directions relative to the plane of the chassis, and operable means associated with said control means for lowering and raising pairs of transverse wheel supporting levers to vary the angle of the chassis longitudinally with respect to the surface, said control means being operable independently of the angular longitudinal disposition of the chassis as determined by said operable means.

2. A suspension device for vehicles comprising, in combination, a generally plane chassis, four wheel supporting levers pivotally mounted on said chassis, a wheel rotatably mounted on each of said levers, control means operably connected to each of said wheel supporting levers such that pivotal movement of any one of said wheel supporting levers caused by an encounter of the respective wheel with a protuberance of a surface along which the vehicle rides will cause operation of the control means to pivot the other three wheel supporting levers, pairs of diagonally opposed wheel supporting levers being pivoted in opposite directions relative to the plane of the chassis, operable means associated with said control means for lowering and raising pairs of transverse wheel supporting levers to vary the angle of the chassis longitudinally with respect to the surface, said control means being operable independently of the angular disposition of the chassis as determined by said operable means, and adjusting means associated with said control means for lowering and raising said wheel supporting levers to vary the height of the chassis above the surface, said adjusting means being operable to raise and lower the chassis independently of the angular disposition of the chassis as determined by said operable means.

References Cited in the file of this patent
UNITED STATES PATENTS 1,928,545     Rondier _____ Sept. 26, 1933

FOREIGN PATENTS 728,631     France _____ Apr. 12, 1932